Jan. 18, 1927.  
W. E. BRUCE  
1,614,870  
STRAW OR FERTILIZER DISTRIBUTOR AND LOADER  
Filed March 13, 1926
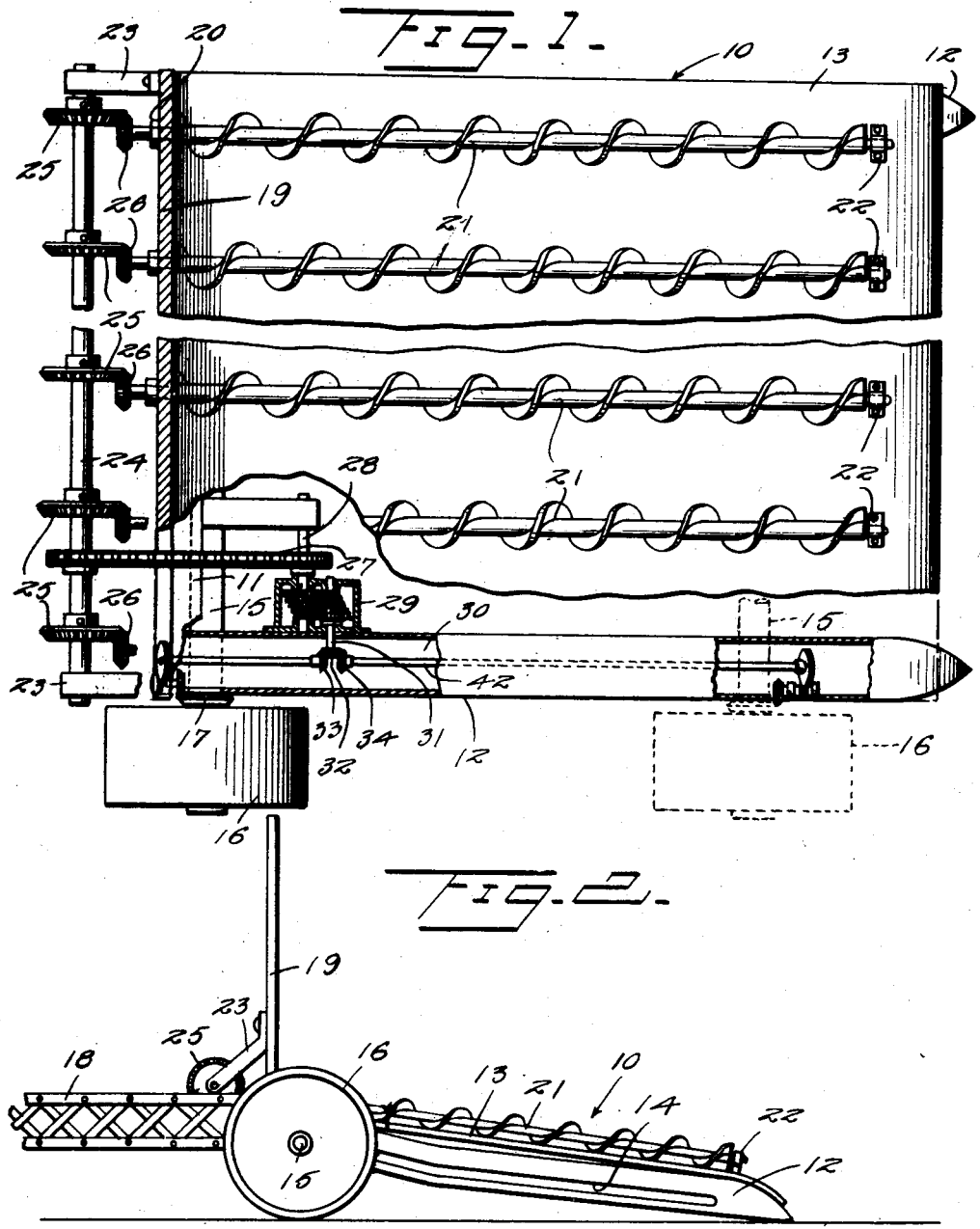
Inventor  
*William E. Bruce*  
By *Watson E. Coleman*  
Attorney Patented Jan. 18, 1927.

1,614,870

UNITED STATES PATENT OFFICE.

WILLIAM E. BRUCE, OF MIRANDO CITY, TEXAS.

STRAW OR FERTILIZER DISTRIBUTOR AND LOADER.

Application filed March 13, 1926. Serial No. 94,493.

This invention relates to straw or fertilizer distributors and more particularly to an improvement of that type of fertilizer or straw distributor, shown in my co-pending application, Serial No. 63,724, filed October 20, 1925, for fertilizers or straw spreaders.

An important object of the invention is to adapt the mechanism disclosed in said prior application for use in combination with worm conveyors for distributing the material which is being handled.

A further object of the invention is to provide a device of this character which may be readily and cheaply produced, which will be durable and efficient in service and a general improvement in the art.

These and other objects I attain by the construction shown in the accompanying drawings, wherein for the purpose of illustration is shown a preferred embodiment of my invention and wherein:—

Figure 1 is a plan view partially in section and partially broken away of a fertilizer or straw spreader constructed in accordance with my invention;

Figure 2 is a side elevation thereof.

Referring now more particularly to the drawings, the numeral 10 generally designates a platform, in the present instance, shown as consisting of a head rail 11 from each end of which project rearwardly directed arms 12. From the head rail 11 and arms 12 a suitable flooring 13 is supported. Each arm 12 is provided with a longitudinally extending slot 14 which opens entirely through the arm transversely of the platform and extends substantially from end to end of the arm. These slots coact for the reception of an axle 15 which is movable from one end to the other of the slot. This axle has supporting wheels 16 at the ends thereof and a supporting wheel 16 at one end has associated therewith a bevel gear 17, for a purpose presently to appear. To the center of the head rail is secured a tongue 18 by means of which the platform 10 may be either pushed or pulled, as is found desirable and the connections between the tongue 18 and the platform are such that the arms and platform incline downwardly, as more clearly shown in Figure 2.

It will be obvious that if the platform is pushed, the axle will tend to remain at the end of the slots 14 of the arms 12 where it is illustrated in solid lines in Figure 2. If, however, the platform is pulled, the axle will tend to remain at the opposite ends of these slots. It will be noted that by reason of this construction, when the platform is being pushed, the lower ends of the arms 12 and accordingly the lower ends of the platform come into close engagement with the ground, while when the platform is being pulled, the platform is elevated from the ground. A structure is thus provided by means of which the loading of the platform is facilitated since it is much easier to engage a load piled upon the ground with the platform in the first named position and the traction device employed will in no way interfere with the loading of the platform. When the device is being pulled during the distributing action, there is no portion of the platform in engagement with the ground and accordingly wear thereon is eliminated.

The above structure is fully disclosed in the pending application referred to and the present invention contemplates the use of distributing worms for assisting in loading and unloading the platform 10. In accordance with my invention, the platform 10 is provided at its rear end with a vertically extending wall 19 in which are journaled, as at 20, the rear ends of worm shafts 21 operating immediately above the upper surface of the platform and extending longitudinally of the platform. The opposite ends of these worm shafts are supported by bearings 22 arranged adjacent the lower end of the platform 10. The vertical wall 18 likewise provides a support for bearings 23 within which are rotatably engaged the ends of a transversely extending horizontal shaft 24. To this shaft are secured bevel gears 25 meshing with bevel pinions 26 carried by the rear ends of the worm shafts 21 so that as the shaft 24 is rotated, the worms 21 are rotated. The shaft is connected by sprocket gearing 27 to the output shaft 28 of a transmission 29 which may be of any suitable construction but is preferably of the construction described in my prior co-pending application. The arms 12 are each in the form of a hollow housing 30 and the input shaft 31 of the transmission projects into this housing and is there provided with a bevel gear 32 with opposite sides of which engage bevel gears 33 and 34. The gear 34 is fast to a shaft 42, the forward end of which has secured thereto a gear 43 meshing with a gear 44 on a jack shaft 45 suitably journaled in the arm housing 30 and having a bevel gear 46 opposing the forward end of the slot 12 and so positioned that it will be engaged by the gear 17 of the supporting wheel when the axle 14 is at the lower end of the slot. The gear 33 is fast to a shaft 47 which has its rear end projected through the rail head 11 and provided with a second gear 48. The gear 48 meshes with a gear 49 on a jack shaft 50 having a bevel gear 51 meshing with the gear 16 when the supporting wheel 16 is next adjacent the head rail. It will thus be seen that means are provided for positively driving the worms in either direction and at any desired speed. Thus, the worms may be employed to load the platform and operate at a relatively high speed as the platform is being pushed into a load of manure which is to be transported. After the manure is loaded, the transmission may be placed at a neutral point until the distributor arrives at the point where distribution is to commence at which time the transmission may be adjusted to discharge material from the platform at a desired rate of speed.

It will be obvious that the construction hereinbefore set forth is obviously capable of a certain range of change and modification without materially departing from the spirit of the invention and I accordingly do not limit myself to such specific structure except as hereinafter claimed.

I claim:—

1. In a device of the type described, a movable platform, means operated by reversal of movement of the platform for causing one end of the platform to move into or out of engagement with the ground including a wheel supported axle for the platform freely shiftable from one end of the platform to the other thereof, a plurality of parallel worms extending longitudinally of the platform and immediately thereabove and means for connecting said worms to the axle to be driven thereby during movement of the platform in either direction.

2. In a device of the type described, a movable platform, means operated by reversal of movement of the platform for causing one end of the platform to move into or out of engagement with the ground including a wheel supported axle for the platform freely shiftable from one end of the platform to the other thereof, a wall arising from one transverse edge of the platform, a plurality of worm shafts journaled in the wall and extending longitudinally over the platform in parallel relation, bearings at the opposite ends of the platform for said worms, a shaft rotatably supported from the platform, a plurality of gears carried by the shaft, pinions carried by said worm shafts and meshing with the gears of the last named shaft and means for connecting the last named shaft with the axle while the axle is at either end of the platform to be driven thereby.

In testimony whereof I hereunto affix my signature.

WILLIAM E. BRUCE.